United States Patent [19]
Greisz et al.

[11] Patent Number: 5,986,748
[45] Date of Patent: Nov. 16, 1999

[54] DUAL BEAM ALIGNMENT DEVICE AND METHOD

[75] Inventors: Mark J. Greisz, Vancouver, Wash.; John Miller, Clackamas, Oreg.

[73] Assignee: SEH America Inc, Vancouver, Wash.

[21] Appl. No.: 09/137,756

[22] Filed: Aug. 21, 1998

[51] Int. Cl.$^6$ .................................................. G01N 21/00
[52] U.S. Cl. .............................................. 356/73; 356/400
[58] Field of Search ..................... 356/399, 401, 356/400, 138, 153, 73; 33/290–299

[56] References Cited

U.S. PATENT DOCUMENTS

| | | |
|---|---|---|
| 3,727,055 | 4/1973 | David et al. . |
| 4,480,918 | 11/1984 | De Fazio . |
| 4,660,981 | 4/1987 | Stridsberg . |
| 4,747,454 | 5/1988 | Perryman . |
| 4,969,745 | 11/1990 | Ibe . |
| 5,020,907 | 6/1991 | Ibe . |
| 5,089,239 | 2/1992 | Mizuishi et al. . |
| 5,106,593 | 4/1992 | Mizuishi et al. . |
| 5,194,791 | 3/1993 | Cull . |
| 5,240,684 | 8/1993 | Baba et al. . |
| 5,254,319 | 10/1993 | Oda et al. . |
| 5,282,016 | 1/1994 | Shen et al. . |
| 5,582,642 | 12/1996 | Korb et al. . |
| 5,764,349 | 6/1998 | Vanneman ................................ 356/138 |
| 5,864,956 | 2/1999 | Dong ........................................ 33/227 |

*Primary Examiner*—Frank G. Font
*Assistant Examiner*—Tu T. Nguyen
*Attorney, Agent, or Firm*—Oliff & Berridge, PLC

[57] ABSTRACT

Method and apparatus for aligning objects involve oppositely directed light beams that originate approximately between the objects and are directed toward the objects. Based on a relative position of the light beams to the objects, the objects are moved into a desired position. The oppositely directed light beams can be coaxial, parallel but not coaxial, or transverse.

21 Claims, 4 Drawing Sheets

DUAL BEAM ALIGNMENT DEVICE AND METHOD

BACKGROUND OF THE INVENTION

1. Field of Invention

This invention generally relates to an alignment system and method using dual opposing radiation beams to align one or more objects. The invention is particularly useful in aligning a seed crystal lifting cable with the center of a semiconductor melt crucible as used in the manufacture of monocrystalline semiconductor ingots.

2. Description of Related Art

Monocrystalline semiconductor ingots that are grown using the Czochralski method are typically formed by dipping a seed crystal into a rotating crucible of molten semiconductor material. As the seed crystal is slowly withdrawn from the melt by a cable, material in the melt crystallizes and forms a larger monocrystalline ingot. The diameter and length of the monocrystalline ingot that is formed are controlled based on various factors, including the pull rate of the crystal from the melt, and the melt surface level.

If the seed crystal lifting wire is not properly aligned with the center of the rotating melt crucible, the growing ingot will wobble in its rotation and not form properly. Accordingly, the seed crystal lifting cable must be properly aligned with the melt crucible.

One existing method for aligning a seed crystal cable with a crucible shaft is shown in FIG. 1. The seed crystal cable 21 is unwound from a seed crystal cable support 20 so that a plumb bob 22 attached to the end of the cable 21 nearly touches the crucible shaft 25. A technician views the position of the plumb bob 22 relative to the crucible shaft 25 and adjusts the position of the seed crystal cable support 20 accordingly.

The plumb bob method for aligning a seed crystal cable with a crucible shaft presents several problems. For example, several hours are required for the plumb bob and cable to stop movement after the cable and plumb bob are initially extended from the cable support. Further, air movement or vibration of the cable support tend to move the plumb bob and cable. In addition, there is no guarantee that the plumb bob point is coaxial with the cable. Thus, the plumb bob method does not always result in accurate alignment of the seed crystal cable and the crucible shaft.

SUMMARY OF THE INVENTION

The invention provides an apparatus for aligning two devices. The apparatus generates two oppositely directed radiation beams that each correspond to one of the devices. Adjustment in the position of at least one of the devices can be made based on the position of the radiation beams relative to the devices.

In one aspect of the invention, the radiation beams are coaxial.

In one aspect of the invention, the radiation beams are substantially parallel, but not coaxial.

In one aspect of the invention, the radiation beams are not parallel.

In one aspect of the invention, the beams are produced by splitting a single beam from a single light source.

The invention also provides a method for aligning two devices wherein oppositely directed radiation beams are emitted toward the devices. Based on the positions of the radiation beams relative to the devices, at least one of the devices is moved to a desired position.

In one aspect of the invention, at least one of the devices is moved automatically in response to detecting one of the radiation beams.

BRIEF DESCRIPTION OF THE DRAWINGS

The invention is described in relation to the following drawings, in which reference numerals refer to like elements, and wherein.

DETAILED DESCRIPTION OF PREFERRED EMBODIMENTS

Although the invention is described in connection with aligning devices in a Czochralski-type crystal growing apparatus, all embodiments of the invention are not limited to this application. In fact, several of the embodiments discussed below are described as providing alignment beams for aligning two generic devices. These devices can be any type of device requiring alignment, including a crane hook and load to be lifted, for example. Further, although the invention is described as aligning vertically displaced objects, the invention can be used to align horizontally displaced objects or objects oriented in other directions.

Figures 1, 2:
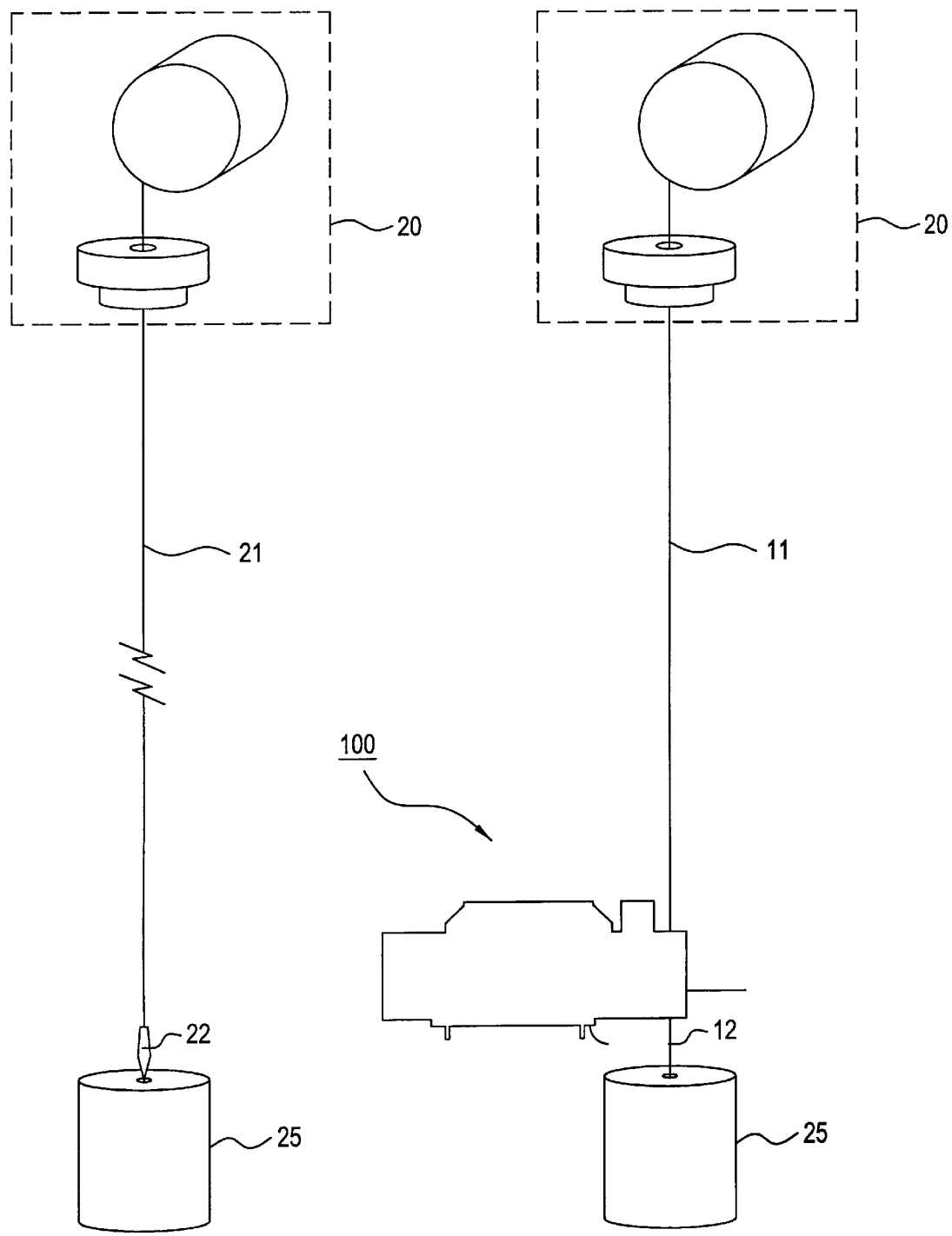
FIG. 1 shows a prior art method for aligning a seed crystal cable with a crucible shaft.
FIG. 2 shows an alignment device in accordance with the invention used to align a seed crystal cable with a crucible shaft in a Czochralski-type crystal growing apparatus.

FIG. 2 shows a first embodiment of an alignment device 100 in accordance with the invention. The alignment device 100 emits an upward light beam 11 that illuminates a seed crystal cable support 20, and a downward light beam 12 that illuminates a crucible shaft 25 in a Czochralski-type crystal growing apparatus. Preferably, the upward light beam 11 is coaxial with the downward light beam 12.

Preferably, the alignment device 100 is used to align the cable support 20 with the crucible shaft 25 as follows. The alignment device 100 is positioned between the cable support 20 and the crucible shaft 25, and is turned on to emit the upward and downward light beams 11 and 12. Preferably, the alignment device 100 is made level. That is, the upward and downward light beams 11 and 12 are aligned with the earth's local gravitational field lines. Although the alignment device 100 is preferably leveled, other orientations are possible depending on the application. For example, the alignment device 100 can be oriented in a desired position relative to one of the objects being aligned. Once the alignment device 100 is leveled, the alignment device 100 is positioned so that the downward light beam 12 preferably illuminates the center of the crucible shaft 25. Then, the position of the cable support 20 is adjusted so that the seed crystal cable 21 is in proper alignment with the crucible shaft 25.

Figure 4:
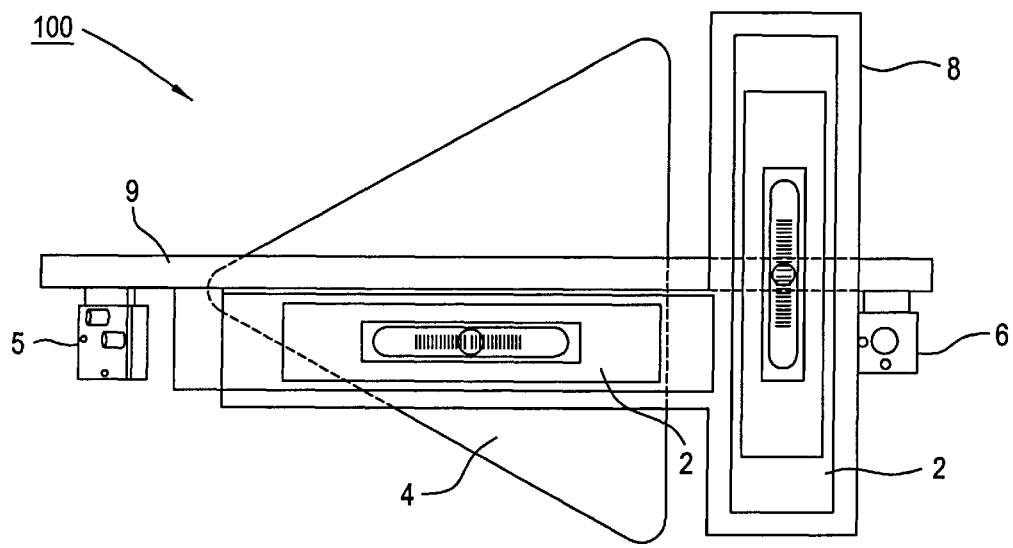
FIG. 4 is a top view of the first embodiment.
Figure 3:
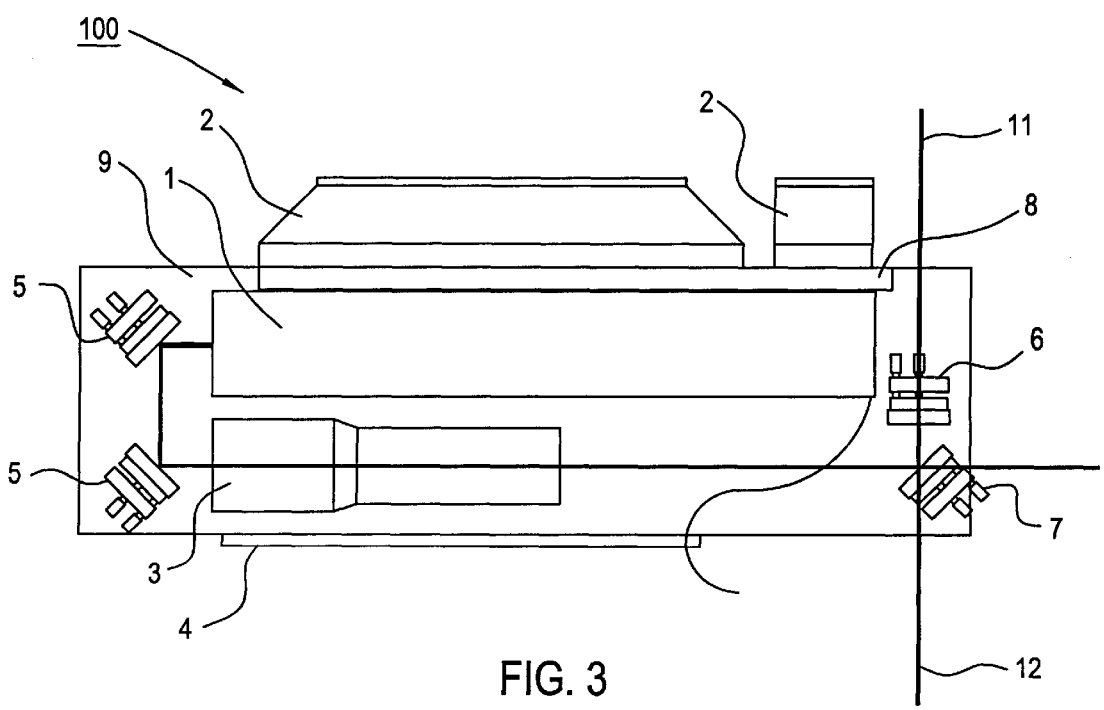
FIG. 3 is a side view of a first embodiment of the invention.

FIGS. 3 and 4 show a side and top view, respectively, of the first embodiment of the alignment device 100. A light source 1, preferably a laser, emits a light beam that, as needed, may be reflected by two turning mirrors 5 to a beam expander 3. The beam expander 3 serves to collimate the light beam and thereby decrease the projected spot size when the light beam travels over long distances. The beam expander 3 can be replaced with other optical elements, such as a condenser lens or other assembly, as is known to those of skill in the art. The collimated light beam strikes a beam splitter 7, which preferably is a 50% pellicle beam splitter. However, other devices can be used, such as a half-mirror or other device. A portion of the light beam may optionally pass through the beam splitter 7; another portion of the beam is reflected to a partially transmissive mirror 6. Preferably, 50% of the light beam is transmitted through the mirror 6 to form the upward light beam 11, and 50% of the light beam is reflected back to the beam splitter 7, although other reflection/transmission ratios can be used. The light reflected by the mirror 6 is partially reflected by the beam splitter 7 back toward the beam expander 3, and partially transmitted through the beam splitter 7 to form the downward light beam 12.

The optical elements of the alignment device 100 are mounted to a mounting plate 9, which is attached to a level mounting plate 8 and a leveling plate 4. Two leveling devices 2 are mounted on the level mounting plate 8. Preferably, the leveling devices 2 are mounted to be perpendicular to each other, but other transverse orientations are possible. The leveling plate 4 has leveling screws 10 that allow a user to finely adjust the position of the alignment device 100 as it preferably rests on a relatively flat and level surface, such as a table. Thus, by rotating the leveling screws 10 and observing the leveling devices 2, the alignment device 100 can be made level. In this embodiment, the leveling devices 2 are precision bubble levels, but can be replaced with other devices, such as gyroscopic or other known devices capable of indicating the position of an object relative to another object. In addition, the leveling screws 10 can be replaced with other automatic or semi-automatic leveling devices, such as hydraulic rams, motor-driven screw devices, electrically operated solenoid devices, etc. The alignment device 100 can also optionally be equipped with a controller device that activates a position adjustment device, such as a hydraulic ram, in response to a position of the alignment device 100 detected by the leveling devices 2. Thus, the controller could automatically adjust the position of the alignment device 100 with or without user input.

Figure 5:
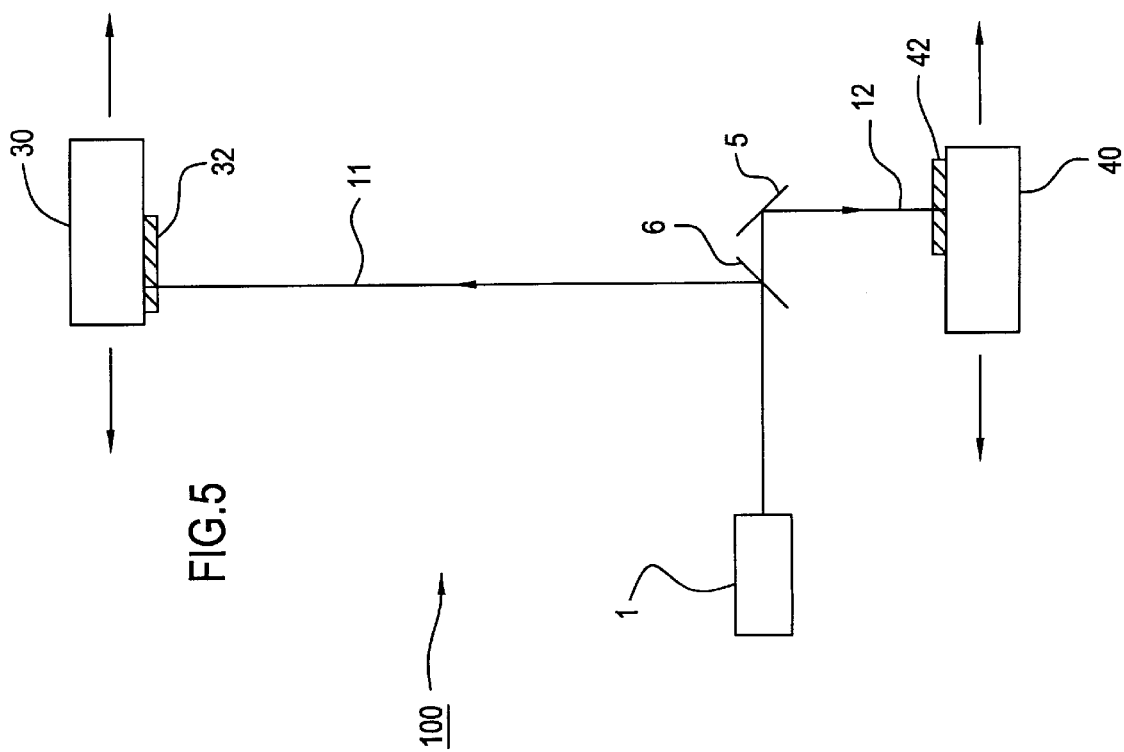
FIG. 5 is a schematic diagram of a second embodiment of the invention.

FIG. 5 shows a second embodiment of the leveling device 100. In this embodiment, a light source 1, which preferably comprises a laser, but can include a point light source and/or a reflector and lens arrangement to produce a collimated light beam, directs a light beam toward, for example, a partially reflective mirror 6. Preferably, the mirror 6 is 50% reflective and 50% transmissive, but, like in the other embodiments, other reflection/transmission ratios can be used. Light reflected by the mirror 6 forms the upward light beam 11 that illuminates an upper detector 32 on an upper object 30. Light transmitted by the mirror 6 is reflected by a mirror 5 to form the downward light beam 12, which illuminates a lower detector 42 on a lower object 40. In this case, the upward light beam 11 is substantially parallel to the downward light beam 12. Based on the location where the upward and downward light beams 11 and 12 illuminate the upper and lower detectors 32 and 42, the upper object 30 and/or the lower object 42 can be moved so that the upper and lower objects 30 and 40 are properly aligned.

Preferably, the upper and lower detectors 32 and 42 are targets that scatter the upward and downward light beams 11 and 12 so that an observer can easily view where the beams 11 and 12 illuminate the detectors 32 and 42. However, the detectors 32 and 42 can be eliminated, or can comprise an imaging object, such as one or more photosensitive elements, that provide an indication, such as outputting an electric signal or creating a display, representing the portion of the detectors 32 and 42 that is illuminated by the light beams 11 or 12. In this embodiment, the detectors 32 and 42 serve as position determining means, although any device useful for aiding in or automatically determining the location of the light beams 11 and/or 12 can be used, such as imaging devices mentioned above, image and/or signal analysis software or hardware, image or other display devices, etc.

The upper and/or lower objects 30 and 42 are preferably moved using position adjustment means that can include manually operated devices, such as positioning screws, skid rails, wheels or mechanical linkages, other devices, such as drive motors and associated transmission devices, automatic drive controllers, hydraulic rams, or other systems. In short, any device that aids in positioning an object can be used as a position adjustment means.

Figure 6:
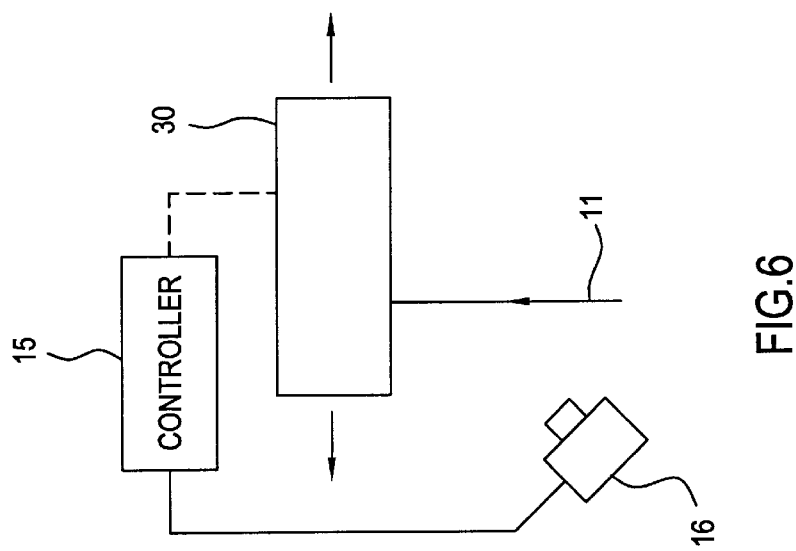
FIG. 6 shows a control device for adjusting the position of an object.

FIG. 6 shows an optional object position control system for use with the alignment device 100. The system shown in FIG. 6 detects and adjusts the position of an upper object 30. However, the system can be used to automatically adjust the position of the lower object 40 or any other object. An imaging device 16, such as a video camera or photosensitive element array, images a portion of the upper object 30 that is illuminated by the upward light beam 11. The imaging device 16 provides a signal to a controller 15 that is representative of the location of the light beam 11 relative to the upper object 30. Based on the position of the light beam 11 relative to the upper object 30, the controller 15 automatically adjusts the position of the upper object 30 to a desired position.

For example, the controller 15 preferably uses the signal from the imaging device 16 to calculate the distance and direction between the illuminated portion of the upper object 30 and a target position on the upper object 30. One way that the controller 15 can determine the distance and direction between the illuminated portion and the target position is to perform image analysis on the signal from the imaging device 16 to determine the locations of the illuminated and target positions. Optionally, the signal from the imaging device 16 can directly represent the location of the illuminated portion that is compared to a stored target position to determine the distance and direction to move the upper object 30. The controller 15 then moves the upper object 30 in the calculated direction and the calculated distance so that the target position is illuminated by the light beam 1. The upper object 30 is preferably moved using a drive motor and mechanical device, such as a ball-and-screw or rack-and-pinion device, shown schematically by a dashed line in FIG. 6. Of course, other position adjustment devices can be used.

In contrast, the controller 15 could determine only a direction to move the upper object 30, and use the signal from the imaging device 16 as feedback to adjust the direction of movement and stop driving the upper object 30 when the target position is illuminated. In addition, the imaging device 16 could be replaced with a detector 32, such as an array of photosensitive elements, that provides a signal to the controller 15 indicating the location of the illuminated portion of the detector 32.

Figure 7:
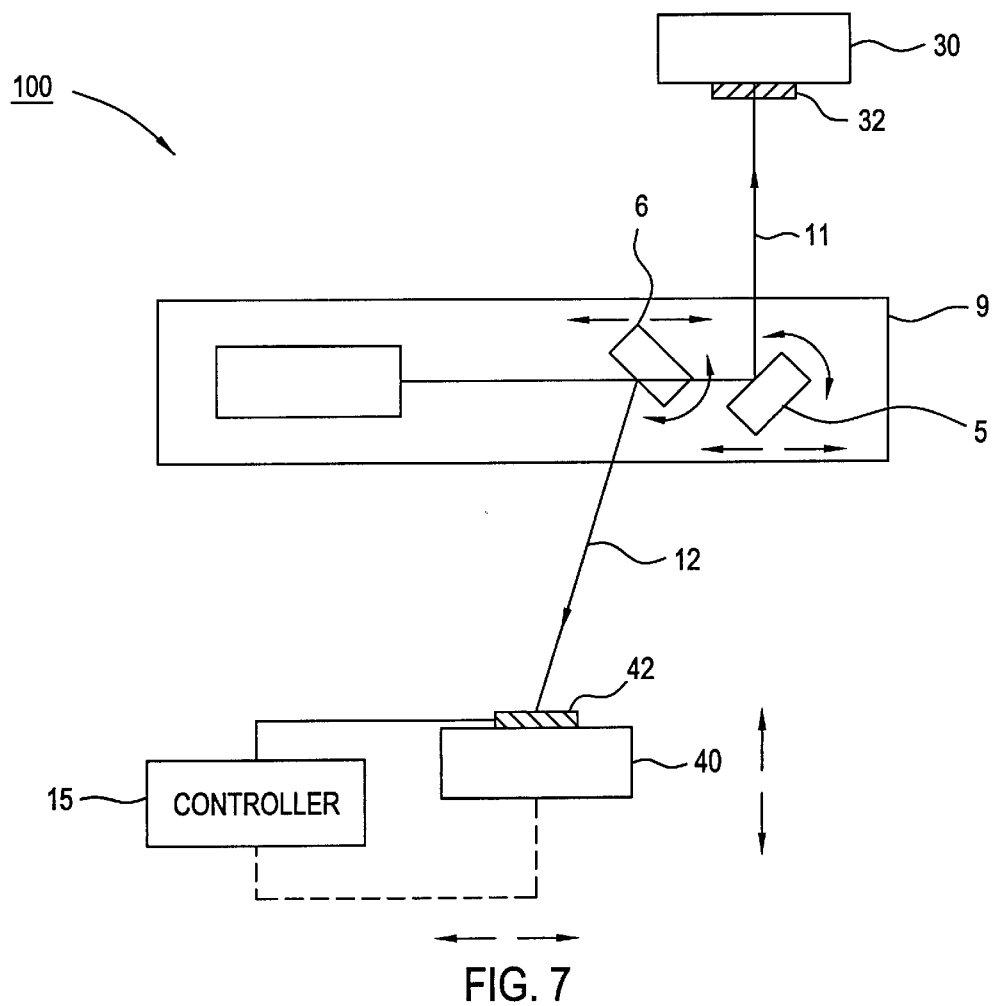
FIG. 7 shows a third embodiment of the invention.

FIG. 7 shows a third embodiment of the alignment device 100. In the FIG. 7 alignment device 100, the upward light beam 11 is not parallel to or coaxial with the downward light beam 12. Instead, the two light beams 11 and 12 are directed in roughly opposite directions and are transverse to each other, i.e., an angle between 0 and 180 degrees separates the two light beams 11 and 12. The FIG. 7 alignment device 100 also differs from the FIG. 5 alignment device 100 in that the partially reflective mirror 6 and the mirror 5 are mounted to a mounting plate 9 so that the partially reflective mirror 6 and mirror 5 can be controllably rotated and moved along the mounting plate 9. This arrangement allows custom adjustment of the angle and relative displacement of the upward and downward light beams 11 and 12. For example, the partially reflective mirror 6 and mirror 5 can be adjusted to create parallel light beams 11 and 12 that are horizontally displaced a desired distance. In addition, the device 100 can be adjusted to generate upward and downward light beams 11 and 12 that are transverse to varying degrees and have varying horizontal displacements.

FIG. 7 also shows an optional object position control system comprising the lower detector 42 and a controller 15. The lower detector 42 preferably comprises an imaging device, such as a linear array of photosensitive elements, that outputs a signal to the controller 15 representing the location where the downward light beam 12 illuminates the lower detector 42. Based on the signal, the controller 15 automatically adjusts the position of the lower object 40 relative to the upper object 30. As shown in FIG. 7, the controller 15 can preferably control the position of the object in at least two perpendicular directions. However, the controller 15 can have the capability to control the position of the lower object 40 in three or more degrees of freedom.

Figure 8:
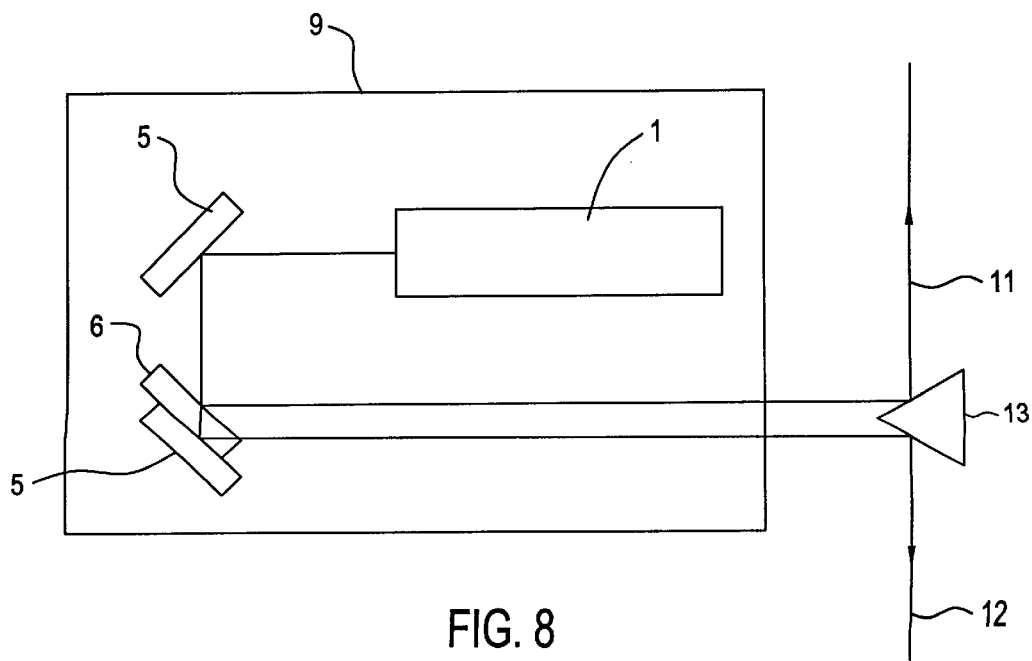
FIG. 8 shows a fourth embodiment of the invention.

FIG. 8 shows a fourth embodiment of the alignment device 100. A light source 1 emits light that is reflected by a mirror 5 to a partially transmissive mirror 6. The partially reflective mirror 6 reflects a portion of the light, e.g., 50%, to a reflecting element 13. Light transmitted by the partially reflective mirror 6 is reflected by a mirror 5 to the reflecting element 13. The reflecting element 13 reflects the light from the partially reflecting mirror 6 and the mirror 5 to create upward and downward light beams 11 and 12. As will be appreciated by those of skill in the art, the reflecting element 13 can have various configurations. For example, the reflecting element 13 could reflect light from the light source 1 to generate parallel, but not coaxial, light beams 11 and 12, or transverse light beams 11 and 12.

Although the embodiments above are described as using visible light beams, other forms of radiation can be used. For example, forms of nonvisible electromagnetic radiation or particle beam emissions can be used to align two objects. The embodiments described above operate by dividing a single light beam into two light beams. However, the single light source and optical elements could be replaced with two or more light sources, such as lasers, that emit oppositely directed parallel, coaxial, or transverse light beams. This arrangement thus eliminates the need for optical elements to divide a single beam into two or more beams. In addition, the embodiments are described as producing only two oppositely directed light beams. Instead, the alignment device 100 could produce three or more light beams to allow desired alignment of three or more objects.

The controllers 15 described in this application can be implemented, at least in part, as a single special purpose integrated circuit (e.g., ASIC) or an array of ASIC, each having a main or central processor section for overall system level control, and separate sections dedicated to performing various specific computations, functions and other processes under the control of the central processor section. The controller 15 or other modules can also be implemented as software modules operating on a general purpose computer and/or by using a plurality of separate dedicated or programmable integrated or other electronic circuits or devices, e.g., hard-wired or electronic or logic circuits such as discrete element circuits or programmable logic devices (including PLDs, PLAs, PALs or the like). The controller 15 also preferably includes other circuitry or components, such as memory, relays, mechanical linkages, communications devices, motors, drive systems, etc. to affect desired control and/or input/output functions or to perform other desired operations.

While the invention has been described with reference to specific embodiments, the description of the specific embodiments is illustrative to only and is not construed to be limiting the scope of the invention. Various other modifications and changes may occur to those skilled in the art without departing from the spirit and scope of the invention as set forth herein.

What is claimed is:

1. A method for aligning two devices, comprising:
   generating at least two oppositely directed illumination beams, each illumination beam corresponding to and directed toward one of the two devices;
   aligning at least one of the illumination beams to be approximately parallel with local gravitational field lines;
   determining positions of each illumination beam with respect to the corresponding device; and
   adjusting a position of one of the devices based on a result of determining the positions where each illumination beam illuminates the corresponding device.

2. The method of claim 1, wherein the step of generating at least two illumination beams comprises generating two oppositely directed and parallel illumination beams.

3. The method of claim 1, wherein the step of generating at least two illumination beams comprises generating two oppositely directed and coaxial illumination beams.

4. The method of claim 1, wherein the step of generating at least two illumination beams comprises generating two oppositely directed and transverse illumination beams.

5. The method of claim 1, wherein the step of determining positions comprises:
   receiving a signal from a detector representing a position of an illumination beam relative to a device; and
   generating a signal representing an amount and direction of movement for the corresponding device.

6. The method of claim 1, wherein the step of adjusting a position comprises automatically moving one of the devices based on a signal representing a position of an illumination beam relative to the device.

7. The method of claim 1, wherein the step of generating at least two illumination beams comprises:
   generating two oppositely directed and coaxial light beams, a first light beam directed toward a crucible shaft in a crystal growing apparatus, and a second light beam directed toward a seed crystal cable support in the crystal growing apparatus;
   wherein the step of determining positions comprises:
     adjusting a position of the light beams such that the first light beam illuminates a desired portion of the crucible shaft, and leveling the alignment device so that the light beams are parallel to local gravitational field lines; and
   wherein the step of adjusting a position comprises:
     moving the seed crystal cable support so that the second light beam illuminates a desired portion of a seed crystal cable support.

8. An alignment device for aligning two objects, comprising:

illumination beam generating means for generating oppositely directed illumination beams, each illumination beam corresponding to and directed toward an object;

leveling means for aligning at least one illumination beam to be approximately parallel with local gravitational field lines;

position determining means for determining a position of each illumination beam relative to a corresponding object; and position adjustment means for adjusting a position of at least one of the objects based on the relative position of an illumination beam with respect to a corresponding object.

9. The alignment device of claim 8, wherein the illumination beam generating means comprises beam splitting means.

10. The alignment device of claim 9, wherein the beam splitting means comprises a beam splitter and a reflector that are positioned such that an illumination beam created by the beam splitter is parallel to and oppositely directed from a beam created by the reflector.

11. The alignment device of claim 10, wherein the beam splitter and reflector are movable relative to each other to create oppositely directed illumination beams that are parallel or transverse to each other.

12. The alignment device of claim 8, wherein the illumination beam generating means comprises leveling means.

13. The alignment device of claim 8, wherein the position determining means comprises illumination beam detection means for detecting a position of an illumination beam relative to an object.

14. The alignment device of claim 8, wherein the position adjustment means comprises controller means and drive means for moving an object based on information relating to a position of an illumination beam relative to the object.

15. A method for aligning a seed crystal cable support and crucible shaft in a Czochralski-type crystal growing apparatus, comprising:

generating at least two oppositely directed illumination beams, a first illumination beam corresponding to and directed toward the crucible shaft, a second illumination beam corresponding to and directed toward the seed crystal cable support;

adjusting a position of the first illumination beam so that the first illumination beam illuminates a desired portion of at least one member selected from the group consisting of the crucible shaft and the seed crystal cable support; and moving the other member selected from the group consisting of seed crystal cable support and the crucible shaft so that the second illumination beam illuminates a desired portion of said other member.

16. The method of claim 15, wherein the first and second illumination beams are coaxial.

17. The method of claim 15, further comprising the step of aligning the illumination beams with local gravitational field lines.

18. The method of claim 17, wherein the step of aligning the illumination beams comprises leveling a beam emitting device.

19. The method of claim 15, further comprising aligning one of the illumination beams with local gravitational field lines.

20. A method for aligning two devices comprising:

generating at least two oppositely directed illumination beams having a common axis, each illumination beam corresponding to and directed toward one of the two devices;

determining positions of each illumination beam with respect to the corresponding device; and adjusting a position of one of the devices based on a result of determining the positions where each illumination beam illuminates the corresponding device.

21. An alignment device for aligning two objects, comprising:

illumination beam generating means for generating oppositely directed illumination beams having a common axis, each illumination beam corresponding to and directed toward an object;

position determining means for determining a position of each illumination beam relative to a corresponding object; and position adjustment means for adjusting a position of at least one of the objects based on the relative position of an illumination beam with respect to a corresponding object.

* * * * *